United States Patent
Yang et al.

(10) Patent No.: US 8,743,952 B2
(45) Date of Patent: Jun. 3, 2014

(54) DIRECT MODE MODULE WITH MOTION FLAG PRECODING AND METHODS FOR USE THEREWITH

(75) Inventors: Yinxia (Michael) Yang, Richmond Hill (CA); Xinghai Li, North York (CA); Xu Gang (Wilf) Zhao, Toronto (CA)

(73) Assignee: VIXS Systems, Inc, Toronto, Ontario (CA)

(*) Notice: Subject to any disclaimer, the term of this patent is extended or adjusted under 35 U.S.C. 154(b) by 1155 days.

(21) Appl. No.: 11/959,429

(22) Filed: Dec. 18, 2007

(65) Prior Publication Data

US 2009/0154549 A1 Jun. 18, 2009

(51) Int. Cl.
*H04N 7/12* (2006.01)

(52) U.S. Cl.
USPC ................................ 375/240.02; 375/240.12

(58) Field of Classification Search
USPC ........................ 375/240.01, 240.02, 240.12
See application file for complete search history.

(56) References Cited

U.S. PATENT DOCUMENTS

| | | | | |
|---|---|---|---|---|
| 5,047,849 A | * | 9/1991 | Hara | 348/383 |
| 5,870,754 A | * | 2/1999 | Dimitrova et al. | 1/1 |
| 6,421,385 B1 | * | 7/2002 | Uenoyama et al. | 375/240.2 |
| 7,233,621 B2 | * | 6/2007 | Jeon | 375/240.15 |
| 7,643,055 B2 | * | 1/2010 | Uebbing | 348/155 |
| 7,764,739 B2 | * | 7/2010 | Yamada et al. | 375/240.12 |
| 7,925,106 B2 | * | 4/2011 | Seo et al. | 382/236 |
| 2004/0212678 A1 | * | 10/2004 | Cooper et al. | 348/155 |
| 2005/0013498 A1 | * | 1/2005 | Srinivasan et al. | 382/239 |
| 2006/0285596 A1 | * | 12/2006 | Kondo et al. | 375/240.16 |
| 2008/0106642 A1 | * | 5/2008 | Srinivasan et al. | 348/452 |
| 2010/0150232 A1 | * | 6/2010 | Nguyen et al. | 375/240.12 |

\* cited by examiner

*Primary Examiner* — Ricky Ngo
*Assistant Examiner* — Christine Ng
(74) *Attorney, Agent, or Firm* — Garlick & Markison; Bruce E. Stuckman

(57) ABSTRACT

A motion compensation module can be used in a video encoder that encodes, into a processed video signal, a video input signal including a sequence of pictures. The motion compensation module includes a motion flag generation module that generates a motion flag for at least one of the plurality of macroblocks of a first picture of the sequence of pictures based on a corresponding macroblock of a plurality of macroblocks of a second picture of the sequence of pictures. A direct mode motion vector module evaluates a direct mode motion vector for the corresponding macroblock of the second picture, based on the motion flag for the at least one of the plurality of macroblocks of the first picture.

17 Claims, 10 Drawing Sheets

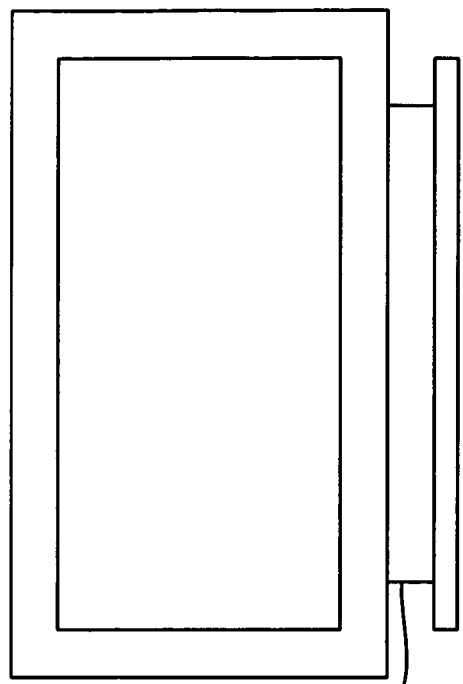
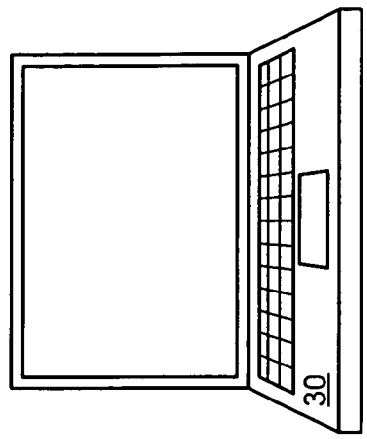
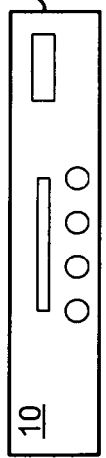
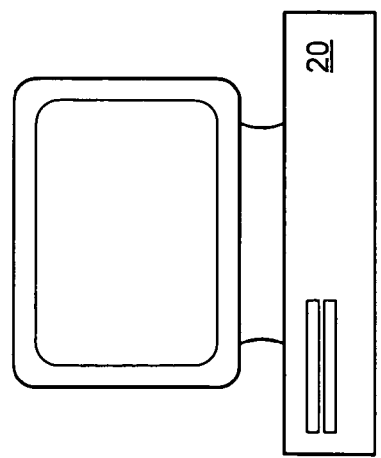
FIG. 1
FIG. 2
FIG. 3

US 8,743,952 B2

DIRECT MODE MODULE WITH MOTION FLAG PRECODING AND METHODS FOR USE THEREWITH

TECHNICAL FIELD OF THE INVENTION

The present invention relates to filtering and encoding used in devices such as video encoders/codecs.

DESCRIPTION OF RELATED ART

Video encoding has become an important issue for modern video processing devices. Robust encoding algorithms allow video signals to be transmitted with reduced bandwidth and stored in less memory. However, the accuracy of these encoding methods face the scrutiny of users that are becoming accustomed to greater resolution and higher picture quality. Standards have been promulgated for many encoding methods including the H.264 standard that is also referred to as MPEG-4, part 10 or Advanced Video Coding, (AVC). While this standard sets forth many powerful techniques, further improvements are possible to improve the performance and speed of implementation of such methods.

Further limitations and disadvantages of conventional and traditional approaches will become apparent to one of ordinary skill in the art through comparison of such systems with the present invention.

BRIEF DESCRIPTION OF THE SEVERAL VIEWS OF THE DRAWINGS

FIGS. 1-3 present pictorial diagram representations of various video processing devices in accordance with embodiments of the present invention.

DETAILED DESCRIPTION OF THE INVENTION INCLUDING THE PRESENTLY PREFERRED EMBODIMENTS

FIGS. 1-3 present pictorial diagram representations of various video processing devices in accordance with embodiments of the present invention. In particular, set top box 10 with built-in digital video recorder functionality or a stand alone digital video recorder, computer 20 and portable computer 30 illustrate electronic devices that incorporate a video processing device 125 that includes one or more features or functions of the present invention. While these particular devices are illustrated, video processing device 125 includes any device that is capable of encoding video content in accordance with the methods and systems described in conjunction with FIGS. 4-12 and the appended claims.

Figure 4:
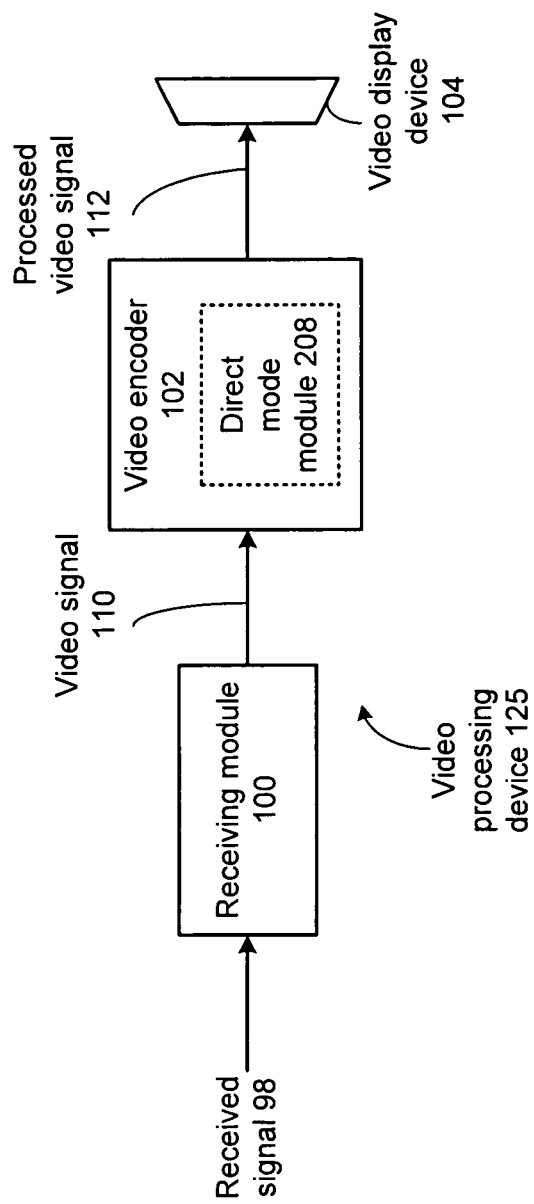
FIG. 4 presents a block diagram representation of a video processing device 125 in accordance with an embodiment of the present invention.

FIG. 4 presents a block diagram representation of a video processing device 125 in accordance with an embodiment of the present invention. In particular, video processing device 125 includes a receiving module 100, such as a television receiver, cable television receiver, satellite broadcast receiver, broadband modem, 3G transceiver or other information receiver or transceiver that is capable of receiving a received signal 98 and extracting one or more video signals 110 via time division demultiplexing, frequency division demultiplexing or other demultiplexing technique. Video encoding module 102 is coupled to the receiving module 100 to encode or transcode the video signal in a format corresponding to video display device 104.

In an embodiment of the present invention, the received signal 98 is a broadcast video signal, such as a television signal, high definition televisions signal, enhanced high definition television signal or other broadcast video signal that has been transmitted over a wireless medium, either directly or through one or more satellites or other relay stations or through a cable network, optical network or other transmission network. In addition, received signal 98 can be generated from a stored video file, played back from a recording medium such as a magnetic tape, magnetic disk or optical disk, and can include a streaming video signal that is transmitted over a public or private network such as a local area network, wide area network, metropolitan area network or the Internet.

Video signal 110 can include an analog video signal that is formatted in any of a number of video formats including National Television Systems Committee (NTSC), Phase Alternating Line (PAL) or Sequentiel Couleur Avec Memoire (SECAM). Processed video signal 112 can operate in accordance with a digital video codec standard such as H.264, MPEG-4 Part 10 Advanced Video Coding (AVC) or other digital format such as a Motion Picture Experts Group (MPEG) format (such as MPEG1, MPEG2 or MPEG4), Quicktime format, Real Media format, Windows Media Video (WMV) or Audio Video Interleave (AVI), etc.

Video display devices 104 can include a television, monitor, computer, handheld device or other video display device that creates an optical image stream either directly or indirectly, such as by projection, based on decoding the processed video signal 112 either as a streaming video signal or by playback of a stored digital video file.

Video encoder 102 includes a direct mode module 208 that operates in accordance with the present invention and, in particular, includes many optional functions and features described in conjunction with FIGS. 5-12 that follow.

Figure 5:
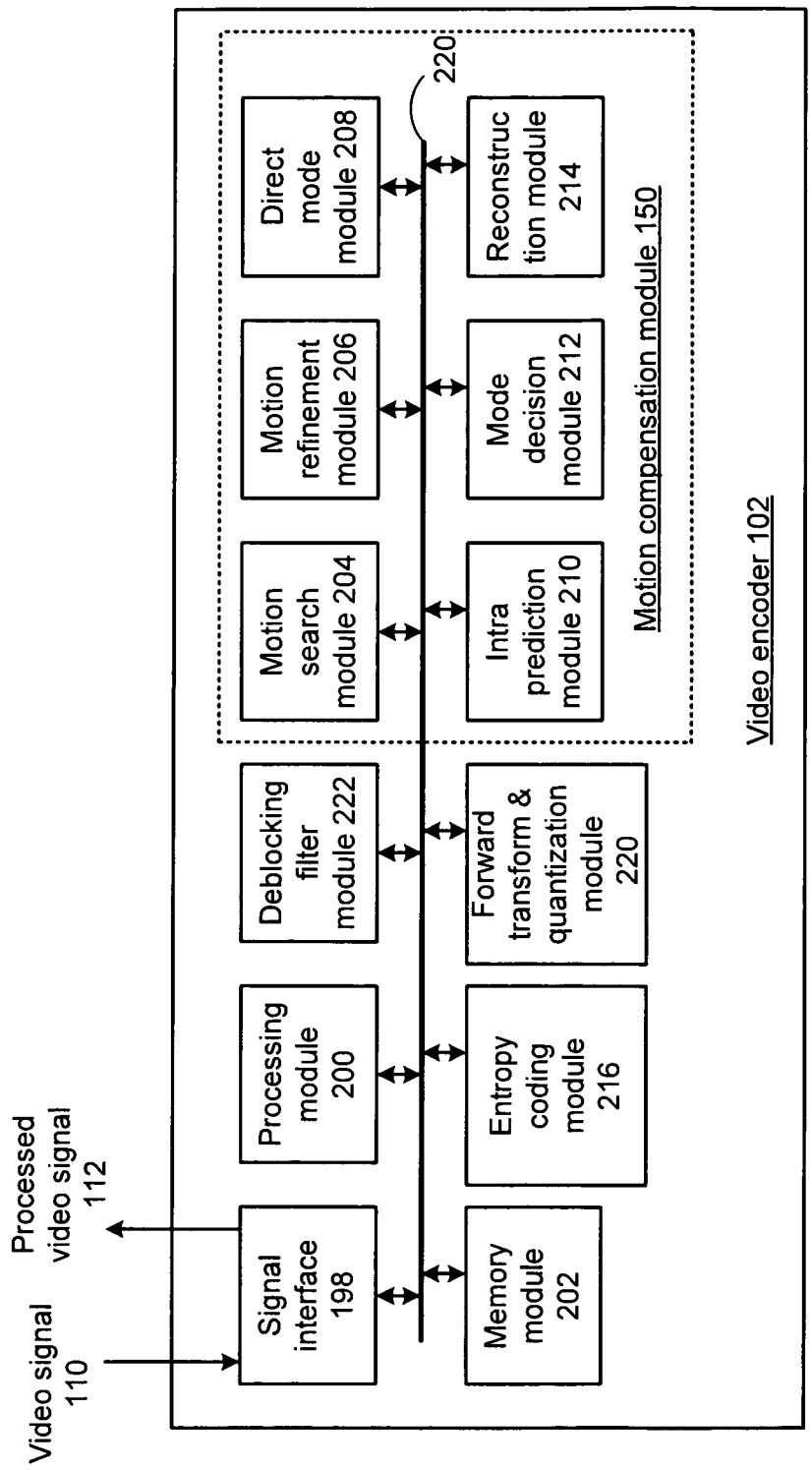
FIG. 5 presents a block diagram representation of a video encoder 102 that includes direct mode module 208 in accordance with an embodiment of the present invention.

FIG. 5 presents a block diagram representation of a video encoder 102 that includes direct mode module 208 in accordance with an embodiment of the present invention. In particular, video encoder 102 operates in accordance with many of the functions and features of the H.264 standard, the MPEG-4 standard, VC-1 (SMPTE standard 421M) or other technique, to encode a video input signal 110 that is converted to a digital format via a signal interface 198.

The video encoder 102 includes a processing module 200 that can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory module 202. Memory module 202 may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Processing module 200, and memory module 202 are coupled, via bus 220, to the signal interface 198 and a plurality of other modules, such as motion search module 204, motion refinement module 206, direct mode module 208, intra-prediction module 210, mode decision module 212, reconstruction module 214, entropy coding module 216, forward transform and quantization module 220 and deblocking filter module 222. The modules of video encoder 102 can be implemented in software, firmware or hardware, depending on the particular implementation of processing module 200. It should also be noted that the software implementations of the present invention can be stored on a tangible storage medium such as a magnetic or optical disk, read-only memory or random access memory and also be produced as an article of manufacture. While a particular bus architecture is shown, alternative architectures using direct connectivity between one or more modules and/or additional busses can likewise be implemented in accordance with the present invention.

Motion compensation module 150 includes a motion search module 204 that processes pictures from the video input signal 110 based on a segmentation into macroblocks of pixel values, such as of 16 pixels by 16 pixels size, from the columns and rows of a frame and/or field of the video input signal 110. In an embodiment of the present invention, the motion search module determines, for each macroblock or macroblock pair of a field and/or frame of the video signal one or more motion vectors (depending on the partitioning of the macroblock into subblocks as described further in conjunction with FIG. 8) that represents the displacement of the macroblock (or subblock) from a reference frame or reference field of the video signal to a current frame or field. In operation, the motion search module operates within a search range to locate a macroblock (or subblock) in the current frame or field to an integer pixel level accuracy such as to a resolution of 1-pixel. Candidate locations are evaluated based on a cost formulation to determine the location and corresponding motion vector that have a most favorable (such as lowest) cost.

In an embodiment of the present invention, a cost formulation is based on the Sum of Absolute Difference (SAD) between the reference macroblock and candidate macroblock pixel values and a weighted rate term that represents the number of bits required to be spent on coding the difference between the candidate motion vector and either a predicted motion vector (PMV) that is based on the neighboring macroblock to the left of the current macroblock and on motion vectors from neighboring current macroblocks of a prior row of the video input signal or an estimated predicted motion vector that is determined based on motion vectors from neighboring current macroblocks of a prior row of the video input signal. In addition, the cost calculation may or may not use neighboring subblocks within the current macroblock.

A motion refinement module 206 generates a refined motion vector for each macroblock of the plurality of macroblocks, based on the motion search motion vector. In an embodiment of the present invention, the motion refinement module determines, for each macroblock or macroblock pair of a field and/or frame of the video input signal 110 a refined motion vector that represents the displacement of the macroblock from a reference frame or reference field of the video signal to a current frame or field. In operation, the motion refinement module refines the location of the macroblock in the current frame or field to a greater pixel level accuracy such as to a resolution of ¼-pixel. Candidate locations are also evaluated based on a cost formulation to determine the location and refined motion vector that have a most favorable (such as lowest) cost. As in the case with the motion search module, a cost formulation is based on the sum of the Sum of Absolute Difference (SAD) between the reference macroblock and candidate macroblock pixel values and a weighted rate term that represents the number of bits required to be spent on coding the difference between the candidate motion vector and either a predicted motion vector (PMV) that is based on the neighboring macroblock to the left of the current macroblock and on motion vectors from neighboring current macroblocks of a prior row of the video input signal or an estimated predicted motion vector that is determined based on motion vectors from neighboring current macroblocks of a prior row of the video input signal. In addition, the cost calculation can avoid the use of neighboring subblocks within the current macroblock. In this fashion, motion refinement module 206 is able to operate on a macroblock to contemporaneously determine the motion search motion vector for each subblock of the macroblock.

When estimated predicted motion vectors are used the cost formulation can avoid the use of motion vectors from the current row and both the motion search module 204 and the motion refinement module 206 can operate in parallel on an entire row of video input signal 110, to contemporaneously determine the refined motion vector for each macroblock in the row.

A direct mode module 208 generates direct mode motion vectors for each macroblock, based on a plurality of macroblocks that neighbor the macroblock. In an embodiment of the present invention, the direct mode module 208 operates in a fashion such as defined by the H.264 standard or other standard, that determines a direct mode motion vector and the cost associated with candidate direct mode motion vectors that can be used in evaluating a mode decision.

Pertinent to the present invention, video encoder 102 operates based on bi-predictive or multi-predictive B-slices. In particular, macroblock or sub-macroblock motion is predicted based on two or more inter-picture predictions. In B slices, to build a prediction, some macroblocks may use a weighted average of different motion compensated prediction values. Different types of inter prediction can be supported such as list 0, list 1, bi-predictive and direct prediction. For bi-prediction mode, a weighted average of motion compensated list 0 and list 1 prediction signals is used for the prediction signal. In direct prediction mode, macroblock pixel values are inferred based on previously transmitted values. For instance, when macroblocks or sub-macroblocks exhibit no motion, i.e. do not change from picture to picture, coding can be performed by sending very few bits indicating direct mode conditions and particularly without sending a quantized error prediction signal or a motion vector, in effect, a zer0-valued motion vector. For B-slice pictures, this condition is referred to as B_Skip.

In accordance with the present invention, the direct mode module 208 includes a direct mode motion vector module that generates the direct mode motion vector based on a motion flag generated by a motion flag generation module. In particular, the motion flag is generated and stored in the processing of one frame or field of the video signal for retrieval when evaluating the direct mode motion vector for a subsequent frame or field of the video signal.

While the prior modules have focused on inter-prediction of the motion vector, intra-prediction module 210 generates a best intra prediction mode for each macroblock of the plurality of macroblocks. In particular, intra-prediction module 210 operates in a fashion such as defined by the H.264 standard to evaluate a plurality of intra prediction modes, based on motion vectors determined from neighboring macroblocks to determine the best intra prediction mode and the associated cost.

A mode decision module 212 determines a final motion vector for each macroblock of the plurality of macroblocks based on costs associated with the refined motion vector, the direct mode motion vector, and the best intra prediction mode, and in particular, the method that yields the most favorable (lowest) cost, or an otherwise acceptable cost. A reconstruction module 214 generates residual luma and chroma pixel values corresponding to the final motion vector for each macroblock of the plurality of macroblocks.

A forward transform and quantization module 220 of video encoder 102 generates processed video signal 112 by transforming coding and quantizing the residual pixel values into quantized transformed coefficients that can be further coded, such as by entropy coding in entropy coding module 216, filtered by de-blocking filter module 222 and output as the processed video signal 112 via signal interface 198 to be transmitted and/or stored.

While not expressly shown, video encoder 102 can include a memory cache, a memory management module, a comb filter or other video filter, and/or other module to support the encoding of video input signal 110 into processed video signal 112.

Figure 6:
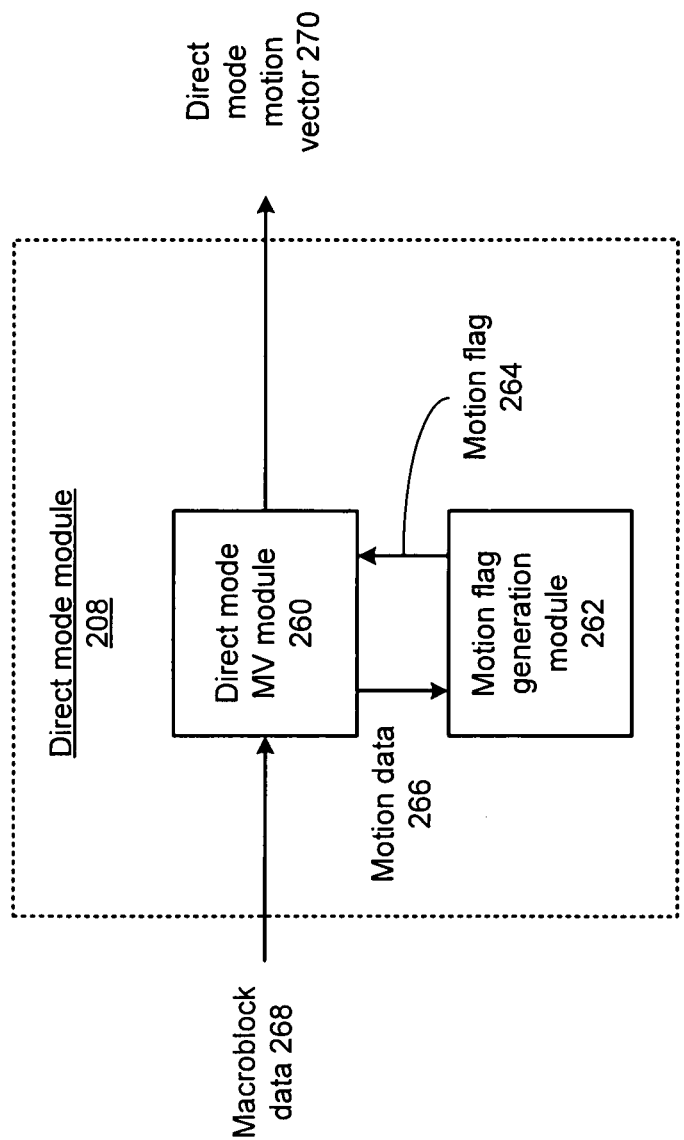
FIG. 6 presents a block diagram representation of a direct mode module 208 in accordance with an embodiment of the present invention.

FIG. 6 presents a block diagram representation of a direct mode module 208 in accordance with an embodiment of the present invention. As discussed in conjunction with FIG. 5, direct mode module includes a direct mode motion vector module and motion flag generation module, such as direct mode motion vector module 260 and motion flag generation module 262. In addition, direct mode module can include other modules (not shown) for performing other direct mode functions in a traditional fashion.

Motion flag generation module 262 generates a motion flag 264 for at least one of the plurality of macroblocks of a first picture of the sequence of pictures based on a corresponding macroblock of a plurality of macroblocks of a second picture of the sequence of pictures. The motion flag 264 can be a flag having a single bit that has a first value that indicates motion and a second value that indicates substantially no motion in relation between the at least one of the plurality of macroblocks or partition of a first picture of the sequence of pictures and the corresponding macroblock or partition of a plurality of macroblocks of a second picture of the sequence of pictures. Direct mode motion vector module 260 generates direct mode motion vector data 270 for the corresponding macroblock of the second picture, based on the motion flag 264 for the at least one of the plurality of macroblocks of the first picture and based on macroblock data 268.

It should be noted that the motion flag 264 can stored in conjunction with processing by the flag generation module 262 of the first picture for retrieval when processing by the direct mode motion vector module 260 of the second picture. This pre-calculation during the processing of the first picture can save storage of more detailed information that would be required during the evaluation of a direct mode motion vector of the second picture and simplify the processing performed during the evaluation of a direct mode motion vector of the second picture. In an embodiment of the present invention, direct mode motion vector module 260 determines a B_Skip condition when processing a B-picture, and generates the direct mode motion vector data 270 that includes a zero-valued direct mode motion vector without a coefficient, only when the motion flag 264 indicates substantially no motion.

In an embodiment of the present invention, the motion flag generation module 262 evaluates motion data 266 such as a direct motion vector, predicted motion vector or other motion data that represents the motion of a macroblock of a first picture with reference to a second picture that occurs after the first picture in the sequence of pictures that make up the video signal 110. In particular, motion flag generation module 262 can determine a cost associated with a motion vector calculated in conjunction with the first picture, such as a sum of absolute differences or sum or absolute transformed differences cost or can otherwise estimate the magnitude of the motion indicated by motion data 266. In response, motion flag generation module 262 set the motion flag 264 to the first value in the presence of motion that would disqualify a B_Skip condition. Otherwise, the flag generation module 262 sets the motion flag to a second value, indicating an acceptable amount of motion, such as no motion or substantially no motion, that would qualify for B_Skip condition.

In this fashion, when direct mode motion vector module 260 evaluates the direct mode motion vector for the second picture, these calculations need not be performed again. If the motion flag 264 has a second value indicating no motion or substantially no motion, the direct mode motion vector module 260 could optionally generate a zero-valued direct mode motion vector without a coefficient.

Further details including several optional features of direct mode motion vector module 260 and motion flag generation module 262 will be described further in conjunction with FIG. 7 that follows.

Figure 7:
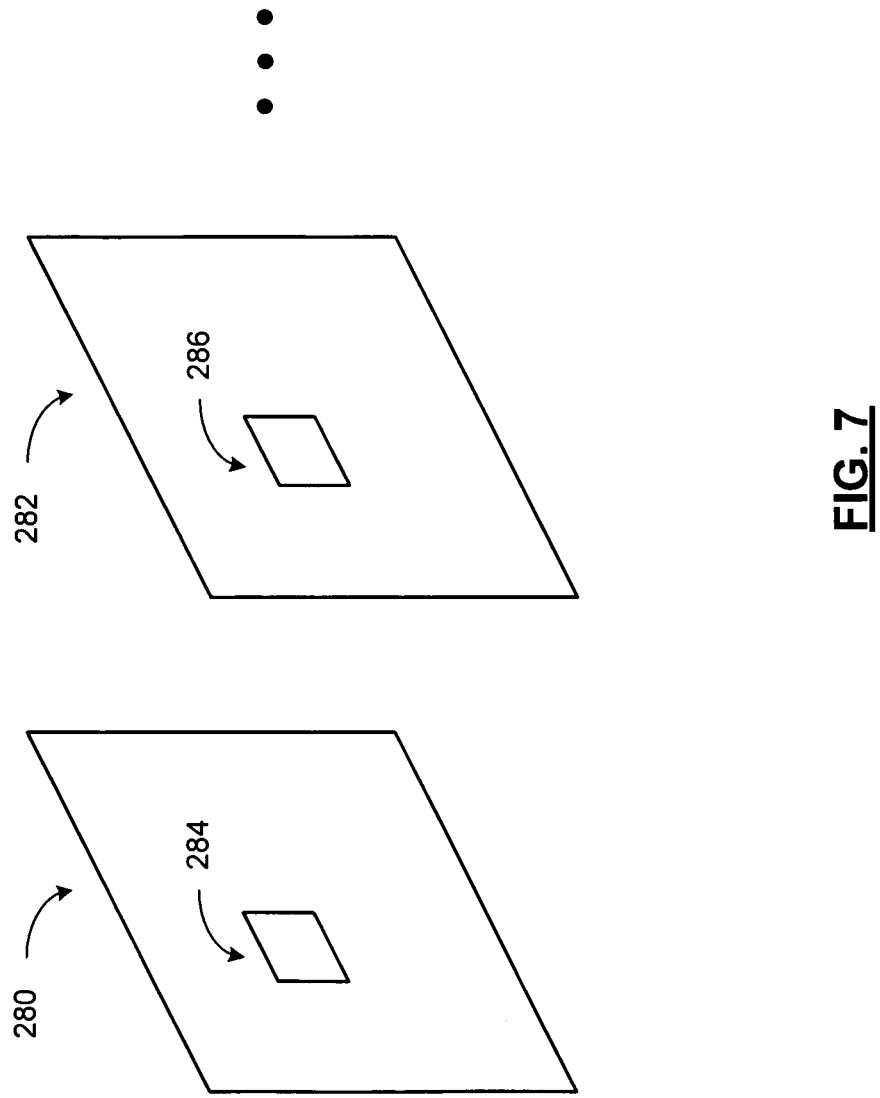
FIG. 7 presents a graphical representation of the relationship between corresponding macroblocks in two pictures in a video input signal.

FIG. 7 presents a graphical representation of the relationship between collocated macroblocks in two pictures in a video input signal. In particular, pictures 280 and 282 represent frames or fields in a sequence of pictures of a video signal such as video signal 110. Picture 282 occurs subsequent to picture 280 and can be the next picture or a subsequent picture with one or more intervening pictures—particularly in conjunction with a multi-predictive mode. Block 284 represents a macroblock or sub-macroblock of picture 280 and block 286 represents a corresponding macroblock or sub-macroblock of picture 282. In bi-predictive or multi-predictive processing of picture 280, block 284 is referenced to block 286. In this example, a motion flag, such as motion flag 264 is generated in conjunction with the processing of picture 280 and stored in a register, cache, buffer or other memory structure that optionally includes other collocated information such as motion vectors, neighbor data, frame and/or field data used in the encoding processing with respect to at least pictures 280 and 282. As will be recognized, this collocated information is temporarily stored during the processing of two or more pictures of video signal 110 and then overwritten, erased or otherwise discarded to make room for data corresponding to subsequent pictures of video signal 110.

As discussed in conjunction with FIGS. 5 and 6, the motion flag generated in conjunction with picture 280 is retrieved and used while processing of picture 282, in particular when picture 282 evaluates a direct mode motion vector for macroblock 286.

Figure 8:
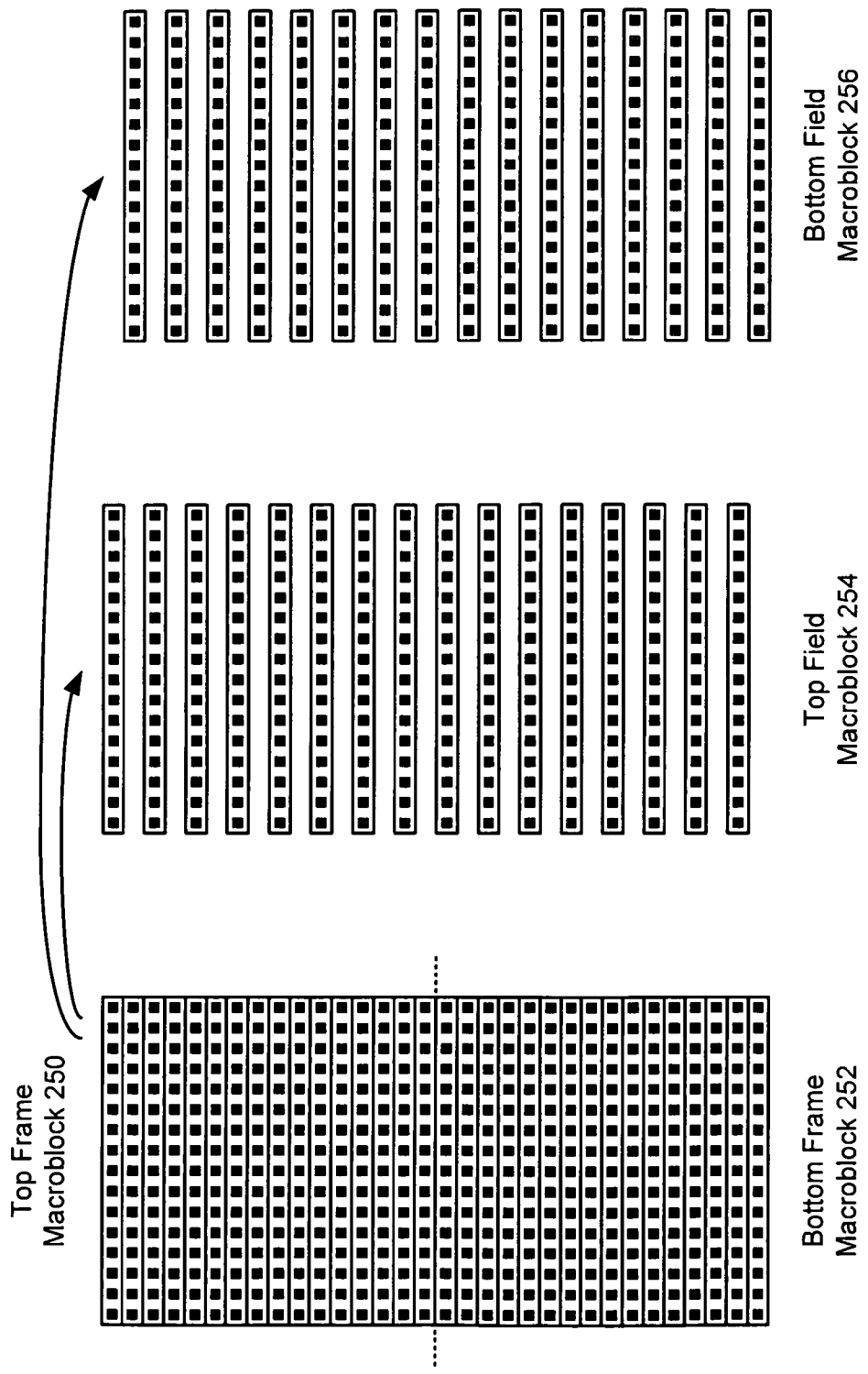
FIG. 8 presents a graphical representation of the relationship between example top frame and bottom frame macroblocks (250, 252) and example top field and bottom field macroblocks (254, 256) in accordance with an embodiment of the present invention.

FIG. 8 presents a graphical representation of the relationship between exemplary top frame and bottom frame macroblocks (250, 252) and exemplary top field and bottom field macroblocks (254, 256). Motion search module 204 generates a motion search motion vector for each macroblock by contemporaneously evaluating a macroblock pair that includes a top frame macroblock 250 and bottom frame macroblock 252 from a frame of the video input signal 110 and a top field macroblock 254 and a bottom field macroblock 256 from corresponding fields of the video input signal 110.

Considering the example shown, each of the macroblocks are 16 pixels by 16 pixels in size. Motion search is performed in full pixel resolution, or other resolution, either coarser or finer, by comparing a candidate frame macroblock pair of a current frame that includes top frame macroblock 250 and bottom frame macroblock 252 to the macroblock pair of a reference frame. In addition, lines of a first parity (such as odd lines) from the candidate frame macroblock pair are grouped to form top field macroblock 254. Similarly, lines of a second parity (such as even lines) from the candidate frame macroblock pair are grouped to form bottom field macroblock 256. Motion search module 204 calculates a cost associated with a plurality of lines by:

(a) generating a cost associated with the top frame macroblock 250 based on a cost accumulated for a plurality of top lines of the plurality of lines, (b) generating a cost associated with the bottom frame macroblock 252 based on a cost accumulated for a plurality of bottom lines of the plurality of lines, (c) generating a cost associated with the top field macroblock 254 based on a cost accumulated for a plurality of first-parity lines of the plurality of lines compared with either a top or bottom field reference, and (d) generating a cost associated with the bottom field macroblock 256 based on a cost accumulated for a plurality of second-parity lines of the plurality of lines, also based on either a top or bottom field reference. In this fashion, six costs can be generated contemporaneously for the macroblock pair: top frame compared with top frame of the reference; bottom frame compared with the bottom frame of the reference; top field compared with top field of the reference; bottom field compared with the bottom field of the reference; top field compared with bottom field of the reference; and bottom field compared with the top field of the reference.

For example, each of these costs can be generated based on the sum of the absolute differences (SAD) of the pixel values of the current frame or field with the reference frame or field. The SADs can be calculated contemporaneously, in a single pass, based on the accumulation for each line. The overall SAD for a particular macroblock (top or bottom, frame or field) can be determined by totaling the SADs for the lines that make up that particular macroblock. Alternatively, the SADs can be calculated in a single pass, based on the smaller segments such as 4×1 segments that can be accumulated into subblocks, that in turn can be accumulated into overall macroblock totals. This alternative arrangement particularly lends itself to motion search modules that operate based on the partitioning of macroblocks into smaller subblocks, as will be discussed further in conjunction with FIG. 9.

The motion search module 204 is particularly well adapted to operation in conjunction with macroblock adaptive frame and field processing. Frame mode costs for the current macroblock pair can be generated as discussed above. In addition, motion search module 204 optionally generates a field decision based on accumulated differences, such as SAD, between the current bottom field macroblock and a bottom field macroblock reference, the current bottom field macroblock and a top field macroblock reference, the current top field macroblock and the bottom field macroblock reference, and the current top field macroblock and the top field macroblock reference. The field decision includes determining which combination (top/top, bottom/bottom) or (top/bottom, bottom/top) yields a lower cost. Similarly, motion search module 204 can optionally choose either frame mode or field mode for a particular macroblock pair, based on whether the frame mode cost compares more favorably (e.g. are lower) or less favorably (e.g. higher) to the field mode cost, based on the field mode decision. In addition, other modes of motion compensation module 150 operating on both frames and field can be used.

Figure 9:
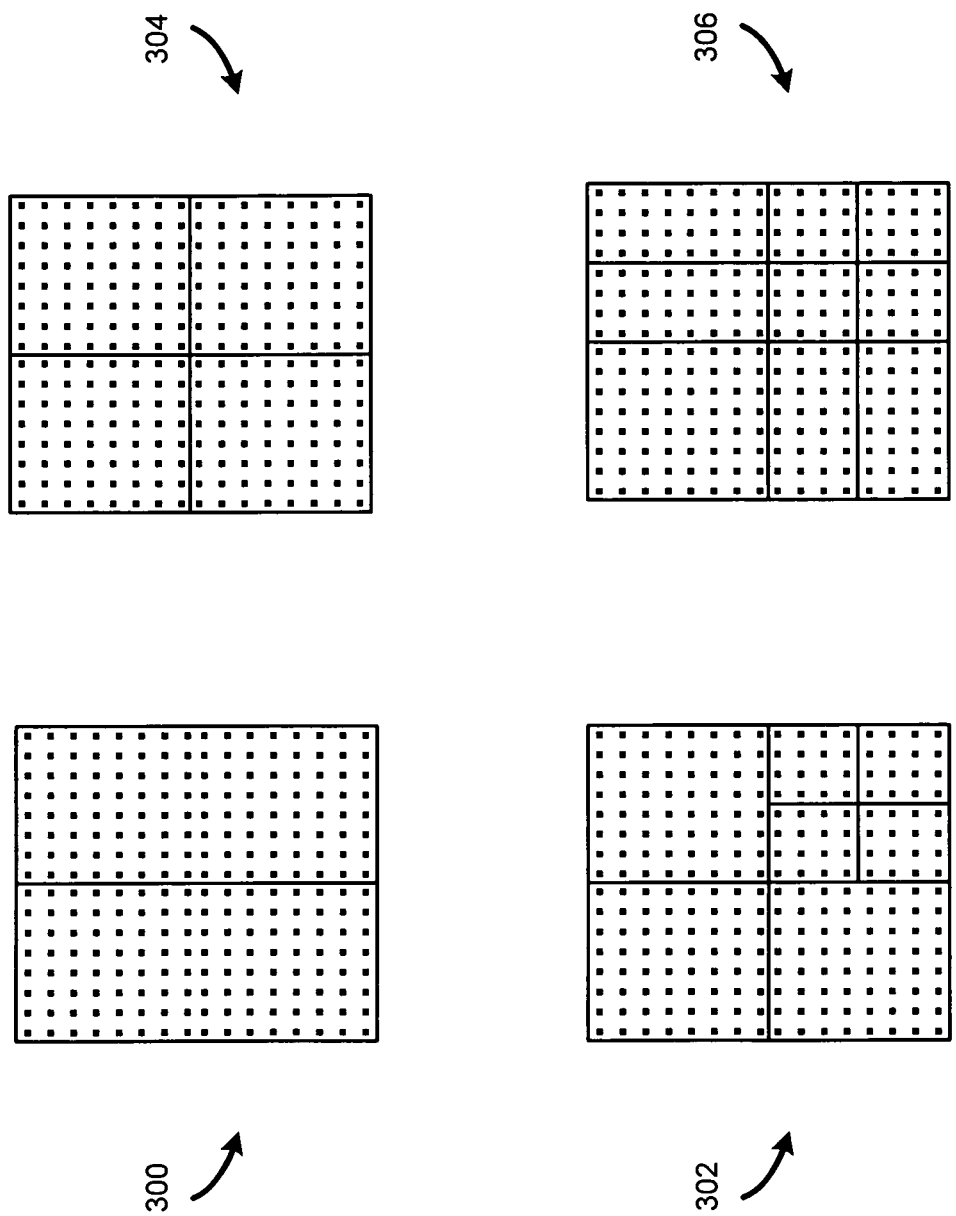
FIG. 9 presents a graphical representation that shows example macroblock partitioning in accordance with an embodiment of the present invention.

FIG. 9 presents a graphical representation of exemplary partitionings of a macroblock of a video input signal into subblocks. While the modules described in conjunction with FIG. 8 above can operate on macroblocks having a size such as 16 pixels×16 pixels, such as in accordance with the H.264 standard, macroblocks can be partitioned into subblocks of smaller size, as small as 4 pixels on a side. The subblocks can be dealt with in the same way as macroblocks. For example, motion search module 204 can generate separate motion search motion vectors for each subblock of each macroblock, etc.

Macroblock 300, 302, 304 and 306 represent examples of partitioning into subblocks in accordance with the H.264 standard. Macroblock 300 is a 16×16 macroblock that is partitioned into two 8×16 subblocks. Macroblock 302 is a 16×16 macroblock that is partitioned into three 8×8 subblocks and four 4×4 subblocks. Macroblock 304 is a 16×16 macroblock that is partitioned into four 8×8 subblocks. Macroblock 306 is a 16×16 macroblock that is partitioned into an 8×8 subblock, two 4×8 subblocks, two 8×4 subblocks, and four 4×4 subblocks. The partitioning of the macroblocks into smaller subblocks increases the complexity of the motion compensation by requiring various compensation methods, such as the motion search to determine, not only the motion search motion vectors for each subblock, but the best motion vectors over the set of partitions of a particular macroblock. The result however can yield more accurate motion compensation and reduced compression artifacts in the decoded video image.

Figure 10:
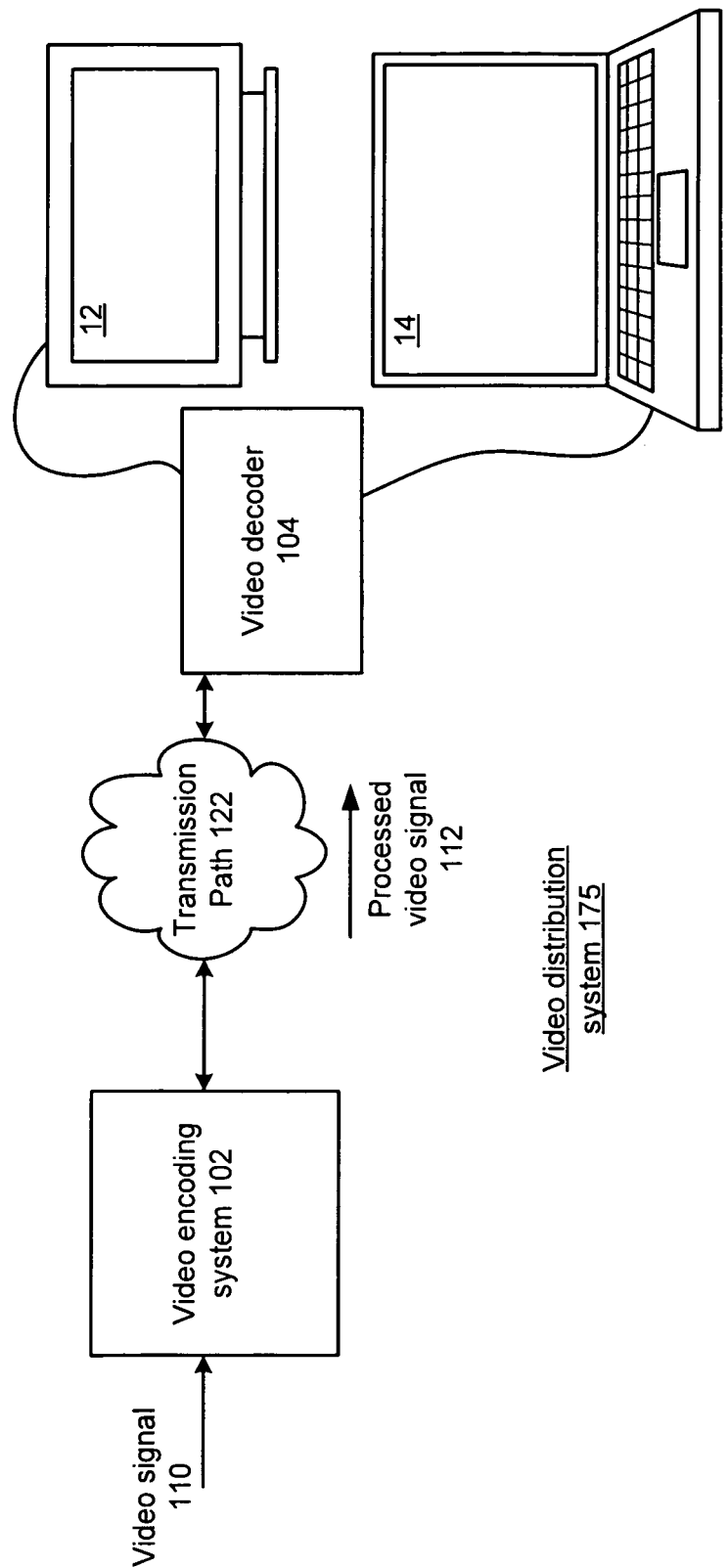
FIG. 10 presents a block diagram representation of a video distribution system 175 in accordance with an embodiment of the present invention.

FIG. 10 presents a block diagram representation of a video distribution system 175 in accordance with an embodiment of the present invention. In particular, processed video signal 112 is transmitted via a transmission path 122 to a video decoder 104. Video decoder 104, in turn can operate to decode the processed video signal 112 for display on a display device such as television 10, computer 20 or other display device.

The transmission path 122 can include a wireless path that operates in accordance with a wireless local area network protocol such as an 802.11 protocol, a WIMAX protocol, a Bluetooth protocol, etc. Further, the transmission path can include a wired path that operates in accordance with a wired protocol such as a Universal Serial Bus protocol, an Ethernet protocol or other high speed protocol.

Figure 11:
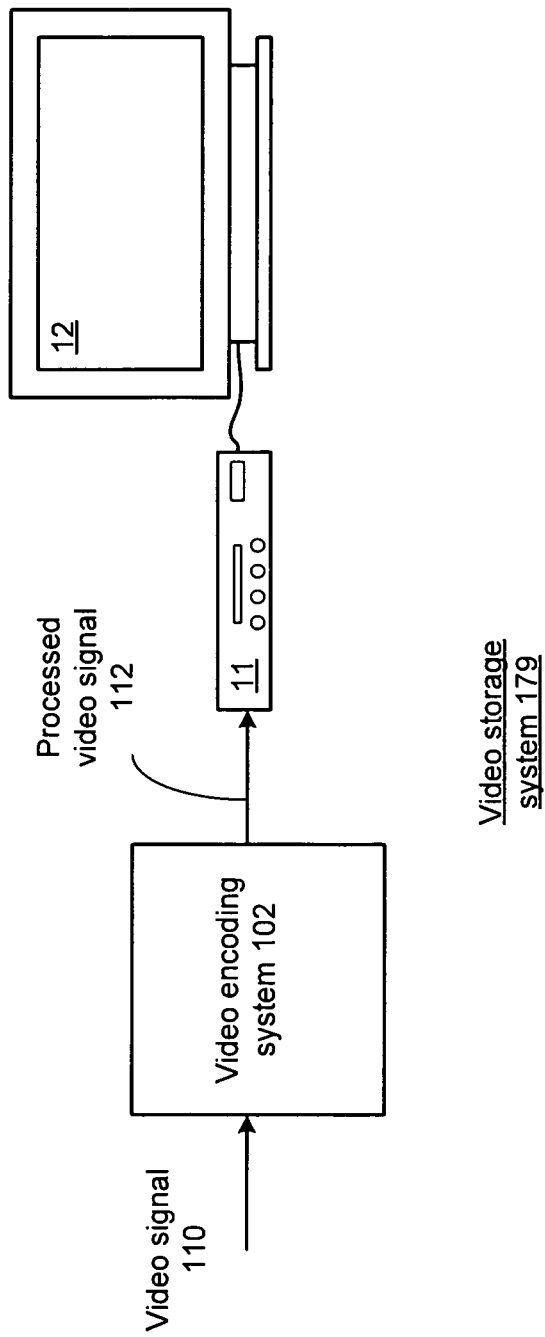
FIG. 11 presents a block diagram representation of a video storage system 179 in accordance with an embodiment of the present invention.

FIG. 11 presents a block diagram representation of a video storage system 179 in accordance with an embodiment of the present invention. In particular, device 11 is a set top box with built-in digital video recorder functionality, a stand alone digital video recorder, a DVD recorder/player or other device that stores the processed video signal 112 for display on video display device such as television 12. While video encoder 102 is shown as a separate device, it can further be incorporated into device 11. While these particular devices are illustrated, video storage system 179 can include a hard drive, flash memory device, computer, DVD burner, or any other device that is capable of generating, storing, decoding and/or displaying the video content of processed video signal 112 in accordance with the methods and systems described in conjunction with the features and functions of the present invention as described herein.

Figure 12:
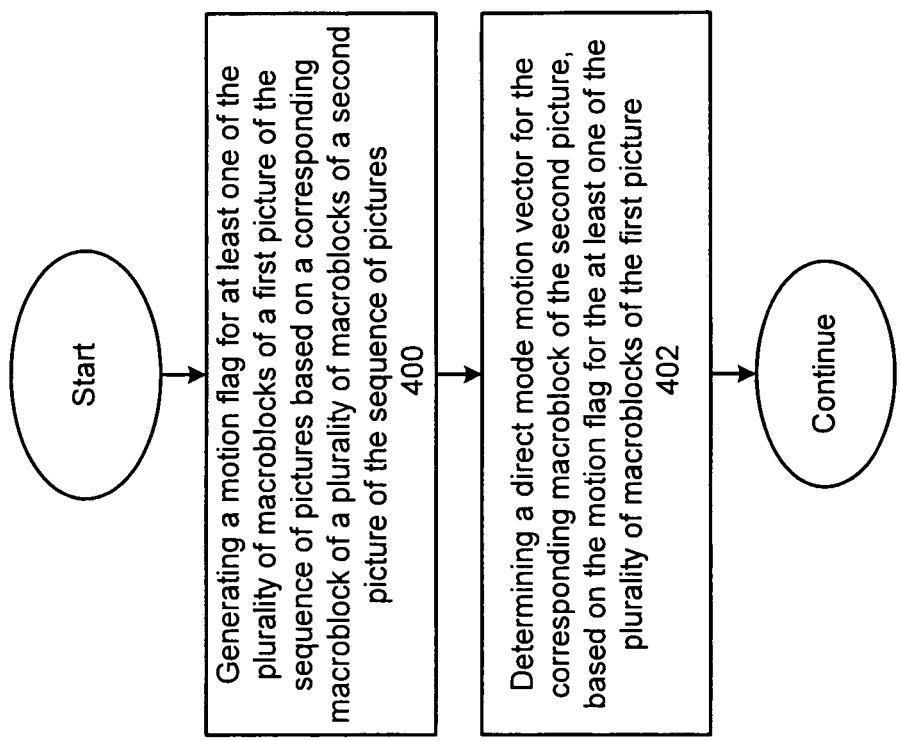
FIG. 12 presents a flowchart representation of a method in accordance with an embodiment of the present invention.

FIG. 12 presents a flowchart representation of a method in accordance with an embodiment of the present invention. In particular, a method is presented for use in conjunction with one or more of the features and functions described in association with FIGS. 1-11. In step 400, a motion flag is generated for at least one of the plurality of macroblocks of a first picture of the sequence of pictures based on a corresponding macroblock of a plurality of macroblocks of a second picture of the sequence of pictures. In step 402, a direct mode motion vector is evaluated for the corresponding macroblock of the second picture, based on the motion flag for the at least one of the plurality of macroblocks of the first picture.

In an embodiment of the present invention, the motion flag can represented by a single bit that has a first value that indicates motion and a second value that indicates substantially no motion. Step 402 can determine a zero-valued direct mode motion vector when or only when the motion flag indicates substantially no motion. Step 400 can include storing the motion flag and the step 402 can include retrieving the motion flag. The second picture can correspond to a B picture of the processed video signal.

In preferred embodiments, the various circuit components are implemented using 0.35 micron or smaller CMOS technology. Provided however that other circuit technologies, both integrated or non-integrated, may be used within the broad scope of the present invention.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As the term module is used in the description of the various embodiments of the present invention, a module includes a functional block that is implemented in hardware, software, and/or firmware that performs one or module functions such as the processing of an input signal to produce an output signal. As used herein, a module may contain submodules that themselves are modules.

Thus, there has been described herein an apparatus and method, as well as several embodiments including a preferred embodiment, for implementing a video encoder and entropy coder with neighbor management for use therewith. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A video encoder that encodes, into a processed video signal, a video input signal including a sequence of pictures, the video encoder comprising:
   a processor comprising a direct mode module, the direct mode module comprising:
   a motion flag generation module that generates a motion flag for at least one of a plurality of macroblocks of a first picture of the sequence of pictures based on a corresponding macroblock of a plurality of macroblocks of a second picture of the sequence of pictures, wherein the second picture is subsequent to the first picture in the sequence of pictures, and wherein the motion flag has a first value that indicates motion and a second value that indicates substantially no motion; and
   a direct mode motion vector module that evaluates a direct mode motion vector for the corresponding macroblock of the second picture, based on the motion flag for the at least one of the plurality of macroblocks of the first picture, wherein the direct mode motion vector module disqualifies a skip mode condition when the motion flag indicates motion and qualifies the skip mode condition for the second picture when the motion flag indicates substantially no motion.

2. The video encoder of claim 1 wherein the motion flag is a single bit flag.

3. The video encoder of claim 1 wherein the motion flag is stored in conjunction with processing by the direct mode motion vector module of the first picture for retrieval when processing by the direct mode motion vector module of the second picture.

4. The video encoder of claim 1 wherein the first picture and the second picture are each one of, a field of the video input signal and a frame of the video input signal.

5. The video encoder of claim 1 wherein the second picture corresponds to a B picture of the processed video signal.

6. The video encoder of claim 1 wherein the video encoder operates in accordance with at least one of, an Advanced Video Coding (AVC) format and a Motion Picture Experts Group (MPEG) format.

7. A video encoder that encodes, into a processed video signal, a video input signal including a sequence of pictures, the video encoder comprising:

a processor comprising a direct mode module, the direct mode module comprising:
a motion flag generation module that generates a motion flag for at least one of the plurality of macroblocks of a first picture of the sequence of pictures based on a corresponding macroblock of a plurality of macroblocks of a second picture of the sequence of pictures, wherein the second picture is subsequent to the first picture in the sequence of pictures; and
a direct mode motion vector module that evaluates a direct mode motion vector for the corresponding macroblock of the second picture, based on the motion flag for the at least one of the plurality of macroblocks of the first picture, wherein the direct mode motion vector module disqualifies a skip mode condition when the motion flag indicates motion and qualifies the skip mode condition for the second picture when the motion flag indicates substantially no motion.

8. The video encoder of claim 7 wherein the motion flag is a single bit flag.

9. The video encoder of claim 7 wherein the motion flag is stored in conjunction with processing by the direct mode motion vector module of the first picture for retrieval when processing by the direct mode motion vector module of the second picture.

10. The video encoder of claim 7 wherein the first picture and the second picture are each one of, a field of the video input signal and a frame of the video input signal.

11. The video encoder of claim 7 wherein the second picture corresponds to a B picture of the processed video signal.

12. The video encoder of claim 7 wherein the video encoder operates in accordance with at least one of, an Advanced Video Coding (AVC) format and a Motion Picture Experts Group (MPEG) format.

13. A method for use in a video encoder that encodes, into a processed video signal, a video input signal including a sequence of pictures, the method comprising:
generating, using a motion flag generation module, a motion flag for at least one of a plurality of macroblocks of a first picture of the sequence of pictures based on a corresponding macroblock of a plurality of macroblocks of a second picture of the sequence of pictures, wherein the second picture is subsequent to the first picture in the sequence of pictures, and wherein the motion flag has a first value that indicates motion and a second value that indicates substantially no motion; and
determining, using a direct mode motion vector module, a direct mode motion vector for the corresponding macroblock of the second picture, based on the motion flag for the at least one of the plurality of macroblocks of the first picture by disqualifying a skip mode condition when the motion flag indicates motion and qualifies the skip mode condition for the second picture when the motion flag indicates substantially no motion.

14. The method of claim 13 wherein the motion flag is a single bit flag.

15. The method of claim 13 wherein the step of generating the motion flag includes storing the motion flag and the step of evaluating the direct mode motion vector includes retrieving the motion flag.

16. The method of claim 13 wherein the second picture corresponds to a B picture of the processed video signal.

17. The method of claim 13 wherein the processed video signal is in accordance with at least one of, an Advanced Video Coding (AVC) format and a Motion Picture Experts Group (MPEG) format.

* * * * *